United States Patent
Ni et al.

(10) Patent No.: US 10,726,602 B2
(45) Date of Patent: Jul. 28, 2020

(54) APPARATUS AND METHOD TO GENERATE REALISTIC THREE-DIMENSIONAL (3D) MODEL ANIMATION

(71) Applicant: SONY CORPORATION, Tokyo (JP)

(72) Inventors: Jie Ni, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 169 days.

(21) Appl. No.: 15/424,315

(22) Filed: Feb. 3, 2017

(65) Prior Publication Data
US 2018/0225857 A1   Aug. 9, 2018

(51) Int. Cl.
*G06T 13/40* (2011.01)

(52) U.S. Cl.
CPC .................. *G06T 13/40* (2013.01)

(58) Field of Classification Search
CPC ...... G06T 13/40; G06T 17/20; G06T 2213/12
See application file for complete search history.

(56) References Cited

U.S. PATENT DOCUMENTS

| | | | | |
|---|---|---|---|---|
| 3,848,527 A | * | 11/1974 | Nihira | B41J 9/10 101/93.23 |
| 6,580,810 B1 | * | 6/2003 | Yang | G06K 9/00228 348/14.1 |
| 9,230,368 B2 | | 1/2016 | Keane et al. | |
| 10,198,871 B1 | * | 2/2019 | Hariton | G06T 19/006 |
| 2003/0108107 A1 | * | 6/2003 | Kim | H04N 19/00 375/242 |
| 2004/0021660 A1 | * | 2/2004 | Ng-Thow-Hing | G06K 9/00369 345/419 |
| 2006/0121993 A1 | * | 6/2006 | Scales | A63F 13/10 463/48 |
| 2011/0267358 A1 | * | 11/2011 | Rennuit | G06T 13/40 345/474 |
| 2012/0019517 A1 | * | 1/2012 | Corazza | G06T 13/40 345/419 |
| 2012/0229248 A1 | * | 9/2012 | Parshionikar | G08B 21/06 340/3.1 |

(Continued)

OTHER PUBLICATIONS

Saeed et al., "Head Pose Estimation on Top of Haar-Like Face Detection: A Study Using the Kinect Sensor" v. 15 (9), Sep. 2015, pp. 20945-20966.

*Primary Examiner* — Abderrahim Merouan
(74) *Attorney, Agent, or Firm* — Chip Law Group

(57) ABSTRACT

A three-dimensional (3D) animation apparatus and method for roll rotation determination for rigged 3D model animation, includes display of a 3D model on a display device, which allows for selection of a first set of three feature points. The selection is executed on a first surface representation of a first facial portion of the displayed 3D model. A second surface representation of a second facial portion of an object is received from a motion-sensing device. A second set of three feature points is identified on the received second surface representation. A roll rotation of a head portion of the 3D model is determined based on the first set of three feature points and the second set of three feature points. The movement of the head portion of the 3D model rendered on the display device is controlled in accordance with the determined roll rotation.

16 Claims, 8 Drawing Sheets

(56) References Cited

U.S. PATENT DOCUMENTS

| | | | |
|---|---|---|---|
| 2013/0235045 A1* | 9/2013 | Corazza | G06T 13/40 345/473 |
| 2014/0035901 A1* | 2/2014 | Chen | G06T 13/40 345/419 |
| 2014/0035934 A1* | 2/2014 | Du | G06T 13/40 345/474 |
| 2015/0068052 A1* | 3/2015 | Krueger | G01C 9/16 33/301 |
| 2015/0077504 A1* | 3/2015 | Fagadar-Cosma | H04N 7/147 348/14.08 |
| 2015/0206456 A1* | 7/2015 | Foster | G09B 23/285 434/262 |
| 2016/0171738 A1* | 6/2016 | Freeman | G06T 13/40 345/473 |
| 2016/0262608 A1* | 9/2016 | Krueger | A61B 3/0041 |
| 2016/0371871 A1* | 12/2016 | Aguado | G06T 13/20 |
| 2018/0096537 A1* | 4/2018 | Kornilov | G06T 19/20 |
| 2018/0122042 A1* | 5/2018 | Kim | H04N 5/2628 |
| 2018/0130175 A1* | 5/2018 | Lin | H04N 13/117 |
| 2019/0255999 A1* | 8/2019 | Watanabe | B60K 35/00 |

* cited by examiner

APPARATUS AND METHOD TO GENERATE REALISTIC THREE-DIMENSIONAL (3D) MODEL ANIMATION

CROSS-REFERENCE TO RELATED APPLICATIONS/INCORPORATION BY REFERENCE

None.

FIELD

Various embodiments of the disclosure relate to three-dimensional (3D) modeling and animation. More specifically, various embodiments of the disclosure relate to an apparatus and method to generate realistic rigged 3D model animation.

BACKGROUND

Advancements in the field of 3D computer graphics, modeling, and animation have provided the ability to animate 3D models and visualize real objects in a 3D computer graphics environment. 3D content, such as 3D character models, are increasingly used in animated movies, games, and virtual-reality systems to enhance user experience. A 3D model is a static 3D mesh that resembles the shape of an object. Typically, such a 3D model is manually designed by computer graphics artists, commonly known as modelers, by use of a modeling software application. Such 3D models may not be used in the same way in animation. Other 3D computer graphics specialists, commonly known as riggers, manually introduce a support structure, such as a digital rig, to the static 3D mesh, to produce a rigged 3D model. A digital rig in a rigged 3D model acts as a skeleton and includes a hierarchical set of interconnected "bones", which may include a system of joints and bones. This allows for definition of the motions for animation in the rigged 3D model. There are several complexities involved in the introduction of different motions for different portions of the support structure of the rigged 3D model. For instance, the motion of arms in terms of degree of freedom may be more restricted as compared to terminal portions of a rigged 3D model, such as hands, feet, or a head portion. Unrealistic motion of the terminal portions of 3D model may lead to various kinds of noticeable artifacts during animation, which may not be desirable.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method to generate a realistic rigged 3D model animation is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
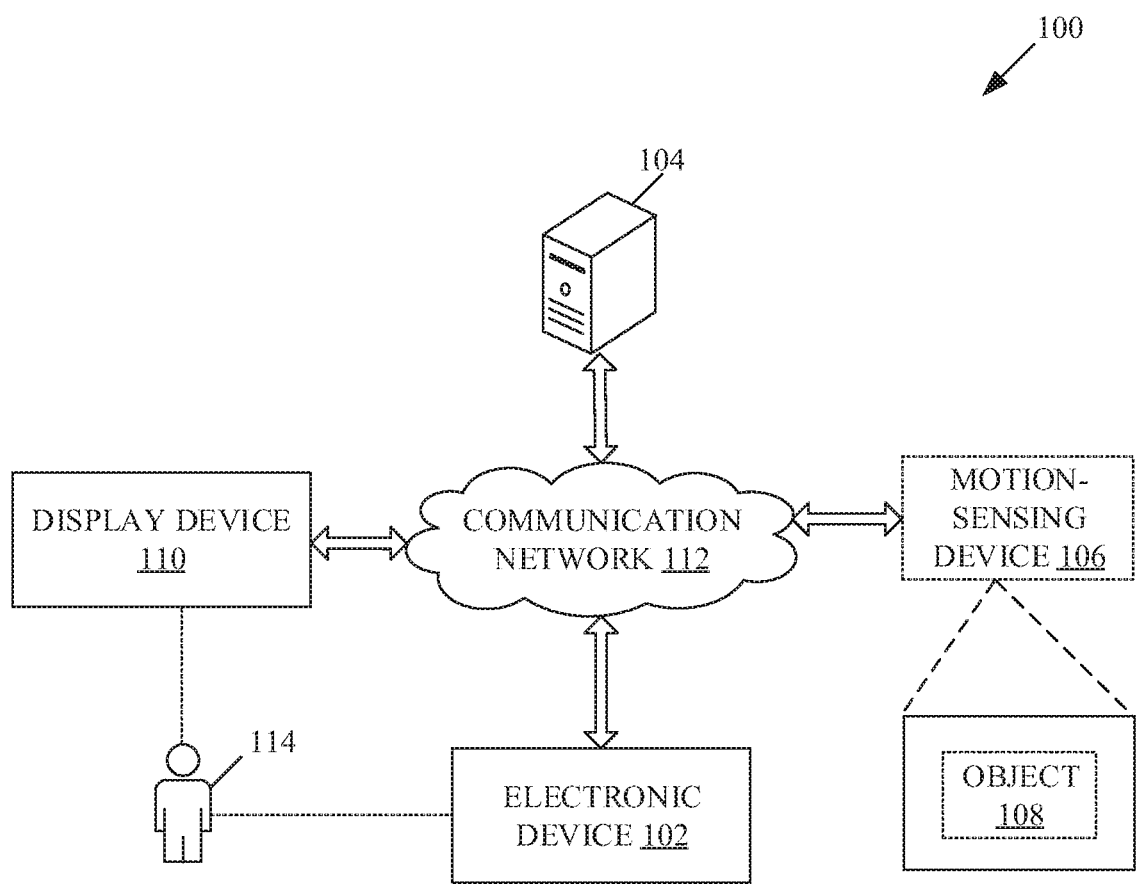
FIG. 1 is a block diagram that illustrates an exemplary network environment for rigged 3D model animation, in accordance with an embodiment of the disclosure.

The following described implementations may be found in the disclosed apparatus and method to generate realistic rigged three-dimensional (3D) model animation. Exemplary aspects of the disclosure may include an apparatus that may be communicatively coupled to a motion-sensing device and a display device. The apparatus may be configured to display a 3D model on the display device. The 3D model may be displayed to allow selection of a first set of at least three feature points on a first surface representation of a first facial portion of a displayed 3D model. The 3D model may refer to a rigged 3D model that may include a hierarchical set of what may be referred to as interconnected "bones". The first surface representation may correspond to a mesh structure of the first facial portion of the 3D model. The apparatus may receive a second surface representation of a second facial portion of an object from the motion-sensing device. The object may correspond to a human. The second surface representation may correspond to mesh structure of the second facial portion. The second facial portion may be received by the motion-sensing device in real time, near-real time, or a lag time. The apparatus may further identify a second set of three feature points, which may correspond to the first set of at least three feature points from the received second surface representation. The apparatus may determine the roll rotation of a head portion of the 3D model, based on the selected first set of at least three feature points on the first surface representation and the second set of three feature points identified on the received second surface representation. The apparatus may control movement of the head portion of the 3D model rendered on the display device, in accordance with the determined roll rotation.

The apparatus may animate a skull bone structure of a head portion of the 3D model, based on a first quaternion computed from a joint position of the head bone structure in the head portion. The apparatus may determine a direction of the head bone structure of the head portion of the 3D model. This may be accomplished by use of locations of the selected first set of at least three feature points on the first surface representation. The determined direction of the head bone structure of the head portion of the 3D model may be set as a rotation axis for the head portion of the 3D model.

The apparatus may estimate a first orientation of the first surface representation based on the selected first set of at least three feature points on the first surface representation. The estimated first orientation of the first surface representation may be normal to a plane determined from the selected first set of at least three feature points on the first surface representation. The apparatus may estimate a second orientation of the second surface representation, based on the identified second set of three feature points on the second surface representation. In accordance with an embodiment, the apparatus may project the first orientation of the first surface representation and the second orientation of the second surface representation onto a plane that is perpendicular to the head bone structure in the head portion of the 3D model. This may be done to determine a roll rotation of the head portion of the 3D model.

The apparatus may compute a second quaternion, based on the direction of the head bone structure of the head portion of the 3D model and an angular difference between the first orientation and the second orientation. The apparatus may further determine the roll rotation of the head portion of the first 3D model, based on the first quaternion and the second quaternion. The apparatus may synchronize one or more movements of the head portion of the first 3D model, rendered on the display device, with one or more movements of the second facial portion of the object tracked by the motion-sensing device. The synchronization of the movements of the head portion of the first 3D model may be executed by application of at least the determined roll rotation to the head portion of the 3D model. The head portion of the 3D model may be rendered on the display device to create a virtual presence of the object at a first location, although the object is located at a second location.

FIG. 1 is a block diagram that illustrates an exemplary network environment to determine roll rotation for rigged 3D model animation, in accordance with an embodiment of the disclosure. With reference to FIG. 1, there is shown a network environment 100. The network environment 100 may include an electronic device 102, a server 104, a motion-sensing device 106, an object 108, a display device 110, and a communication network 112. There is further shown a user 114 associated with the electronic device 102. The user 114 may also be associated with the display device 110. The electronic device 102 may be communicatively coupled to the server 104, the motion-sensing device 106, and the display device 110, via the communication network 112.

The electronic device 102 may comprise suitable logic, circuitry, interfaces, and/or code that may be configured to determine a roll rotation of a head portion of a rigged 3D model. The electronic device 102 may be configured to control the movement of the head portion of the rigged 3D model, rendered on the display device 110, which may be based on the determined roll rotation. Examples of the electronic device 102 may include, but are not limited to, a gaming device, a video-conferencing system, an augmented reality-based device, a computing device, a server, a computer work-station, a mainframe machine, and/or other electronic devices.

The server 104 may comprise suitable circuitry, interfaces, and/or code that may be configured to store one or more rigged 3D models, bone structure and motion information associated with the one or more rigged 3D models. Examples of the server 104 may include, but are not limited to, an application server, a cloud server, a web server, a database server, a file server, a gaming server, a mainframe server, or a combination thereof.

The motion-sensing device 106 may comprise suitable logic, circuitry, interfaces, and/or code that may be configured to capture motion of the object 108. The motion-sensing device 106 may be configured to capture one or more poses of a facial portion of the object 108 in a real time, near-real time, or a lag time. The motion-sensing device 106 may be further configured to generate a surface representation of the facial portion, such as a face mesh, of the object 108, based on a captured pose. The motion-sensing device 106 may be configured to transmit the generated surface representation of the facial portion to the electronic device 102, via the communication network 112. The motion-sensing device 106 may comprise a plurality of sensors, such as a depth sensor, an infrared (IR) sensor, and/or a color sensor (such as a RGB sensor), which may capture the one or more poses of the facial portion of the object 108. Examples of the motion-sensing device 106 may include, but are not limited to, the depth sensor, the IR sensor, the RGB sensor, a 3D mesh structure generator for a moving object, such as the object 108, an image sensor, a motion detector device, or a combination thereof.

The object 108 may refer to an object-of-interest, whose motion is to be captured by the motion-sensing device 106. The object 108 may be a human, an animal, or a robot that may mimic natural bodily movements of a real human or animal. A human body includes a skeleton that provides a framework that supports the body and maintains its shape. The human skeleton includes a hierarchical set of interconnected bones, where joints (also referred to as articulations) between the bones allow certain degrees of movement of human body parts, such as head, hands, and feet. As with an actual skeleton, a rig in a rigged 3D model includes a hierarchical set of interconnected bones, similar to the human system of joints and bones, which allows for the definition of movements during animation in the rigged 3D model. The shape of the bones in the rig may not be required to be same as that of an actual human skeleton.

The display device 110 may comprise suitable logic, circuitry, interfaces, and/or code that may be configured to render the rigged 3D model received from the electronic device 102. In accordance with an embodiment, the display device 110 may be able to receive input from a user, such as the user 114. In such a scenario, the display device 110 may be a touch screen that enables the user 114 to provide input. Alternatively, the display device 110 may receive the input through a virtual keypad, a stylus, a gesture-based input, and/or a touch-based input. The display device 110 may be realized through several known technologies, such as, but not limited to, a Liquid Crystal Display (LCD) display, a Light Emitting Diode (LED) display, a plasma display, and/or an Organic LED (OLED) display technology, a combination thereof, and/or other display. In accordance with an embodiment, the display device 110 may refer to a display screen of smart-glass device, a see-through display, a projection-based display, an electro-chromic display, and/or a transparent display. The see-through display may be a transparent or a semi-transparent display. In accordance with an embodiment, the see-through display and/or the projection-based display may generate a 3D optical illusion that the rigged 3D model is floating in air at a pre-determined distance from a user's eye, such as the user 114, thereby providing an enhanced user experience.

The communication network 112 may include a communication medium through which the electronic device 102 may be communicatively coupled with the server 104.

Examples of the communication network 112 may include, but are not limited to, the Internet, a cloud network, a Wireless Fidelity (Wi-Fi) network, a Local Area Network (LAN), and/or a Metropolitan Area Network (MAN). Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

In operation, the electronic device 102 may be configured to display a rigged 3D model on the display device 110 associated with the user 114. The displayed rigged 3D model may comprise a first surface representation of a first facial portion. The first surface representation of the first facial portion may refer to a mesh structure of the first facial portion generated by the electronic device 102. For example, the first surface representation of the first facial portion may correspond to a face mesh of the rigged 3D model. Further, the electronic device 102 may be configured to render a user-interactive application interface on the display device 110, to allow the user 114 to select a first set of at least three feature points on the first surface representation of the first facial portion of the displayed rigged 3D model. The first set of at least three feature points may correspond to a set of any three non-collinear points on the first surface representation of the first facial portion that lies in a plane parallel to a plane of the first surface representation of the first facial portion. For example, the user 114 may select a first feature point on a left side of a nose on the first surface representation, a second feature point on a right side of the nose on the first surface representation, and a third feature point on the middle of a chin on the first surface representation.

After the selection of three non-collinear points, the electronic device 102 may be configured to receive input that corresponds to the selected first set of at least three feature points, from the display device 110. The electronic device 102 may be further configured to receive a second surface representation of a second facial portion of the object 108, from the motion-sensing device 106. In accordance with an embodiment, the motion-sensing device 106 may be configured to capture one or more poses of the second facial portion of the object 108 in real time, near-real time, or a lag time. Thereafter, the motion-sensing device 106 may be configured to generate the second surface representation of the second facial portion of the object 108, which corresponds to the captured pose of the second facial portion. The second surface representation of the second facial portion may correspond to a mesh structure. The motion-sensing device 106 may be further configured to transmit the second surface representation of the second facial portion of the object 108 to the electronic device 102.

After reception of the second surface representation, the electronic device 102 may be configured to identify a second set of three feature points on the received second surface representation. The second set of three feature points may be equivalent to the first set of at least three feature points. For instance, the electronic device 102 may be configured to identify a first feature point on a left side of a nose on the second surface representation. Similarly, a second feature point may be identified on a right side of the nose on the second surface representation. A third feature point may then be identified on the middle of a chin on the second surface representation, similar to that of the first set of three feature points on the first surface representation. In accordance with an embodiment, the electronic device 102 may render the second set of three feature points on the display device 110, via a user interface (UI), such as an application interface. The UI may allow the user 114 to make manual corrections to the identified second set of three feature points. The manual corrections may include a selection of another second set of three feature points in accordance with the first set of at least three feature points. Alternatively, the second set of at three feature points, may be automatically identified.

The electronic device 102 may be further configured to animate a head bone structure of a head portion of the rigged 3D model. The head portion of the rigged 3D model may comprise the first surface representation of the first facial portion. The head bone structure of the head portion may be utilized to define one or more movements of the head portion of the rigged 3D model. Thereafter, the electronic device 102 may be configured to determine a direction of the head bone structure of the head portion of the rigged 3D model. The electronic device 102 may determine the direction of the head bone structure by use of locations of the first set of at least three feature points on the first surface representation. The electronic device 102 may be configured to set the determined direction of the head bone structure as a rotation axis for the head portion of the rigged 3D model.

The electronic device 102 may be further configured to estimate a first orientation of the first surface representation, based on the first set of at least three feature points. The first orientation of the first surface representation may be perpendicular to a plane in which the first set of at least three feature points on the first surface representation lie. The electronic device 102 may be further configured to estimate a second orientation of the second surface representation, based on the identified second set of three feature points on the second surface representation. The second orientation of the second surface representation may be perpendicular to a plane in which the second set of three feature points on the second surface representation lie. In accordance with an embodiment, the electronic device 102 may be further configured to determine a first horizontal level associated with the first orientation and a second horizontal level associated with the second orientation. The first horizontal level may correspond to a plane in which the first orientation lies. The second horizontal level may correspond to a plane in which the second orientation lies.

In the event that the first horizontal level and the second horizontal level are co-planer, the electronic device 102 may determine an angular difference between the first orientation and the second orientation. In an alternate event in which the first horizontal level and the second horizontal level are not co-planer, the electronic device 102 may project the first orientation of the first surface representation and the second orientation of the second surface representation to a plane that is perpendicular to the head bone structure in the head portion of the rigged 3D model. Thereafter, the electronic device 102 may be configured to determine the angular difference between the projected first orientation and the projected second orientation.

The electronic device 102 may be further configured to determine the roll rotation of the head portion of the rigged 3D model, based on at least the determined angular difference. The roll rotation may refer to a sideward movement of the head portion of the rigged 3D model around an axis of rotation. For example, the head portion of the rigged 3D model may rotate 180 degrees around the axis of rotation, such that the first facial portion moves from a left direction to a right direction. Thereafter, the electronic device 102 may be configured to control movement of the head portion of the rigged 3D model, in accordance with the determined roll rotation. The electronic device 102 may be configured to render at least the head portion of the rigged 3D model with controlled movement on the display device 110.

In accordance with an embodiment, the motion-sensing device 106 may be configured to capture one or more poses of one or more other anatomical portions such as, but not limited to a hand portion, a leg portion of the object 108. In accordance with an embodiment, the functionalities of the electronic device 102 may be implemented by the server 104. In accordance with an embodiment, the electronic device 102 may be configured to render the head portion of the rigged 3D model with controlled movement on one or more other display devices (not shown).

Figure 2:
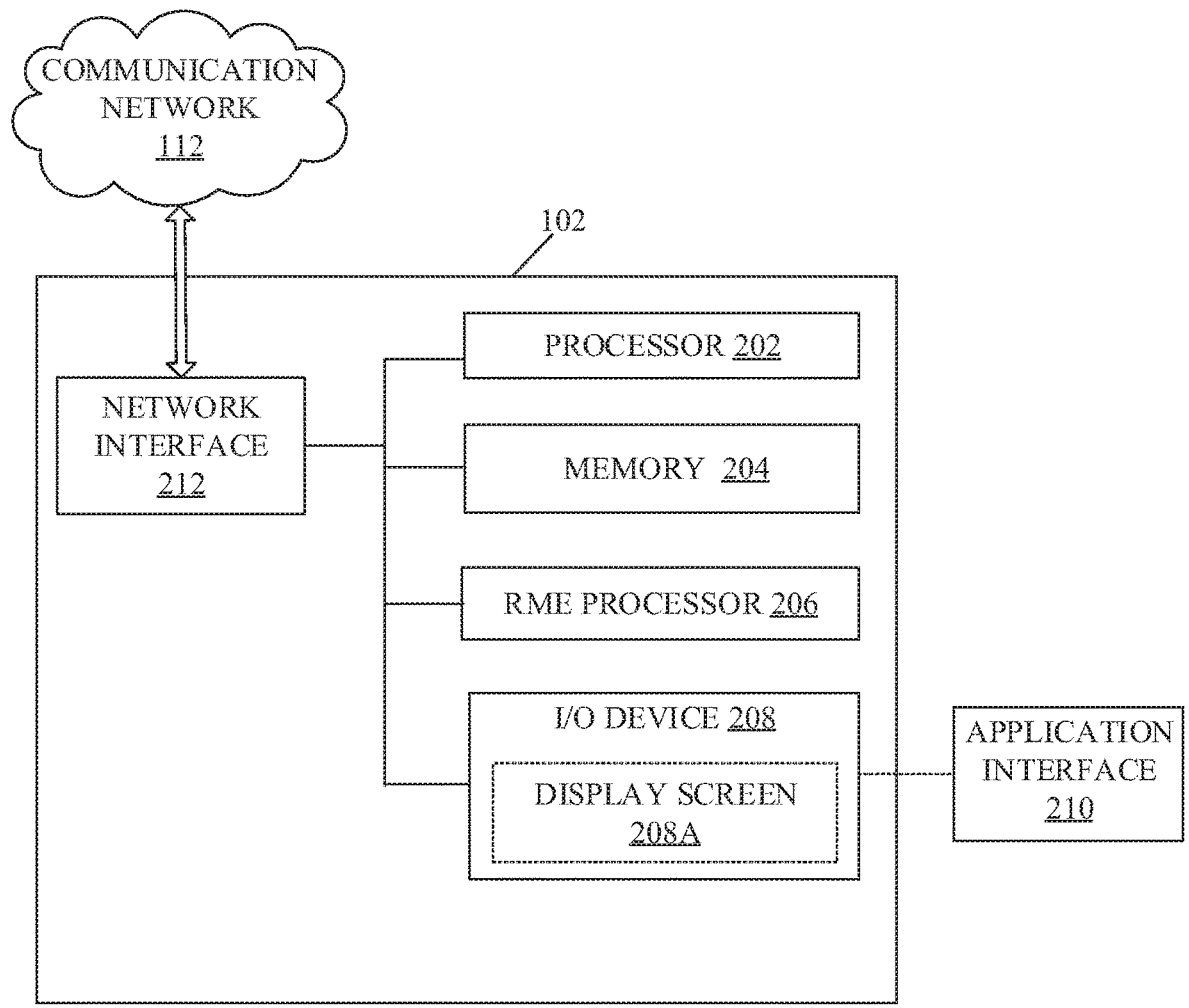
FIG. 2 is a block diagram that illustrates an exemplary electronic device, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the electronic device 102. The electronic device 102 may include a processor 202, a memory 204, a roll motion estimation (RME) processor 206, an input/output (I/O) device 208, and a network interface 212. The I/O device 208 may include a display screen 208A that may be utilized to render an application interface 210. The processor 202 may be communicatively coupled to the memory 204, the RME processor 206, the I/O device 208, and the network interface 212. The network interface 212 may be configured to communicate with the server 104 and the motion-sensing device 106, via communication network 112.

The processor 202 may comprise suitable logic, circuitry, interfaces, and/or code that may be configured to execute a set of instructions stored in the memory 204. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may comprise suitable logic, circuitry, and/or interfaces that may be configured to store a set of instructions executable by the processor 202. The memory 204 may be configured to store operating systems and associated applications. The memory 204 may be further configured to store various algorithms to estimate one or more orientations, such as the first orientation and the second orientation, of one or more surface representations, such as the first surface representation and the second surface representation. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The RME processor 206 may comprise suitable logic, circuitry, interfaces, and/or code that may be configured to identify the second set of three feature points on the second surface representation, in accordance with the first set of three feature points on the first surface representation. The RME processor 206 may be a specialized processor or circuitry configured to determine the roll rotation of the head portion of the rigged 3D model, based on the selected first set of three feature points and the second set of three feature points. The RME processor 206 may be implemented as a separate special-purpose processor or circuitry in the electronic device 102. Alternatively, the RME processor 206 and the processor 202 may be implemented as an integrated processor or a cluster of processors that perform the functions of the RME processor 206 and the processor 202. The RME processor 206 may be implemented as a set of specialized instructions stored in the memory 204, which upon execution may perform the functions and operations for the electronic device 102.

The I/O device 208 may comprise suitable logic, circuitry, interfaces, and/or code that may be configured to receive an input from the user 114. The I/O device 208 may be further configured to provide an output to the user 114. The I/O device 208 may comprise various input and output devices, which may be configured to communicate with the processor 202. Examples of the input devices may include, but are not limited to, a touch screen, a keyboard, a mouse, a joystick, and/or a microphone. Examples of the output devices may include, but not limited to, the display screen 208A and/or a speaker.

The display screen 208A may comprise suitable logic, circuitry, interfaces, and/or code that may be configured to render the application interface 210, to display realistic animation of the rigged 3D model. In accordance with an embodiment, the display screen 208A may be able to receive input from the user, such as the user 114. In such a scenario, the display screen 208A may be a touch screen that enables the user 114 to provide input. The touch screen may correspond to at least one of a resistive touch screen, a capacitive touch screen, or a thermal touch screen. In accordance with an embodiment, the display screen 208A may receive the input through a virtual keypad, a stylus, a gesture-based input, and/or a touch-based input. The display screen 208A may be realized through several known technologies such as, but not limited to, at least one of a Liquid Crystal Display (LCD) display, a Light Emitting Diode (LED) display, a plasma display, and/or an Organic LED (OLED) display technology, and/or other display. In accordance with an embodiment, the display screen 208A may refer to a display screen of smart-glass device, a see-through display, a projection-based display, an electro-chromic display, and/or a transparent display. The see-through display may be a transparent or a semi-transparent display. In accordance with an embodiment, the see-through display and/or the projection-based display may generate an optical illusion that the rigged 3D model is floating in air at a pre-determined distance from a user's eye, such as the user 114, similar to the display device 110.

The network interface 212 may comprise suitable logic, circuitry, interfaces, and/or code that may be configured to establish communication between the electronic device 102, the server 104, and the motion-sensing device 106, via the communication network 112. The network interface 212 may be implemented by use of various known technologies to support wired or wireless communication of the electronic device 102 with the communication network 112. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS).

The functions and/or operations performed by the electronic device 102, as described in FIG. 1, may be performed by the processor 202 and/or the RME processor 206. Other operations performed by the processor 202 and the RME processor 206 are further described in details in FIGS. 3A, 3B, and 3C.

Figure 3A:
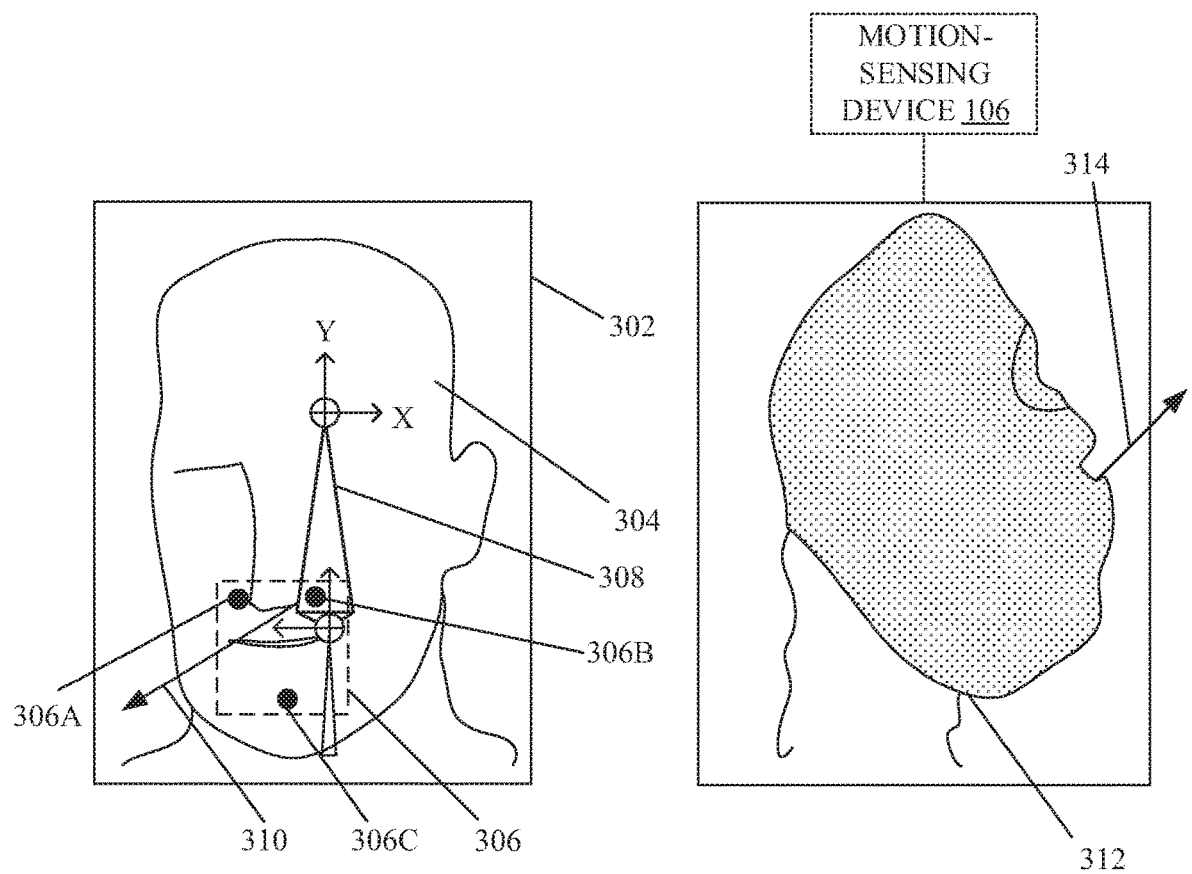
FIGS. 3A, 3B, and 3C, collectively, illustrate an example of determination of roll rotation of a head portion of a rigged 3D model, in accordance with an embodiment of the disclosure.
Figure 3B:
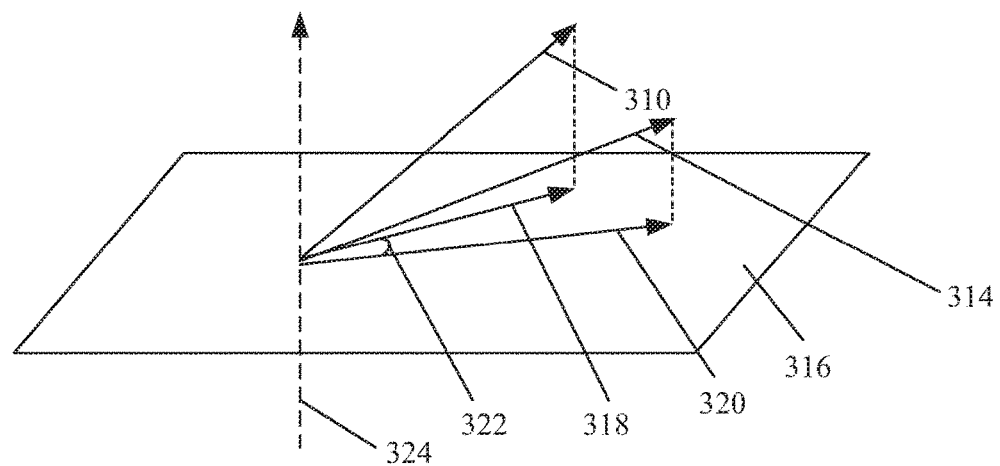
Figure 3C:
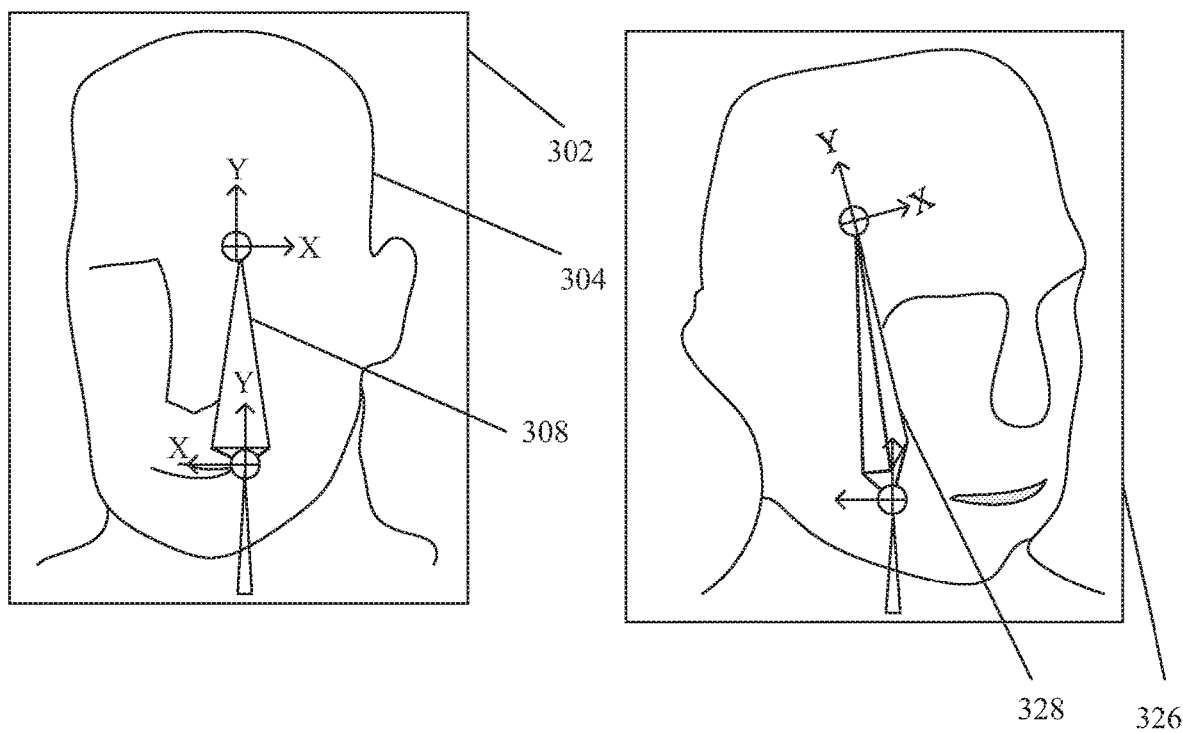

FIGS. 3A, 3B, and 3C, collectively, illustrate an example of determination of roll rotation of a head portion of a rigged 3D model, in accordance with an embodiment of the disclosure. FIGS. 3A, 3B, and 3C are described in conjunction with elements from FIGS. 1 and 2. With reference to FIG. 3A, there is shown a head portion 302 of a rigged 3D model, a first surface representation 304, a first set of three feature points 306, a head bone structure 308 of the head portion 302, and a first orientation 310. The first set of three feature points 306 may comprise a first feature point 306A, a second feature point 306B, and a third feature point 306C. A second surface representation 312 of a second facial portion of an object, such as the object 108, and a second orientation 314, are also shown.

In accordance with the exemplary scenario, the processor 202 may be configured to retrieve the rigged 3D model from the server 104. The processor 202 may further display the head portion 302 of the rigged 3D model on the display screen 208A. The head portion 302 may correspond to a terminal portion of the rigged 3D model, which may display a first facial portion of the head portion 302 to a user, such as the user 114. The rigged 3D model may be generated by use of one or more 3D modelling software applications, or other applications known in the art. The rigged 3D model may comprise a mesh structure and a hierarchical set of interconnected bones. For instance, the head portion 302 of the rigged 3D model may comprise the first surface representation 304 and the head bone structure 308. The first surface representation 304 may correspond to the mesh structure and the head bone structure 308 may correspond to an end bone in the hierarchal set of interconnected bones of the rigged 3D model. The hierarchal set of interconnected bones may be bound to the mesh structure. Further, one or more movements of the bones in the hierarchal set of interconnected bones may be utilized to determine one or more poses of the mesh structure. For instance, the head bone structure 308 may be bound to the first surface representation 304. One or more movements of the head bone structure 308 may be utilized to determine the one or more poses of the first surface representation 304. In accordance with an embodiment, the processor 202 may be configured to display the complete rigged 3D model on the display screen 208A, which may include the head portion 302.

Based on the head portion 302 of the rigged 3D model displayed on the display screen 208A, the user 114 may select the first set of three feature points 306 on the first surface representation 304 of the first facial portion of the head portion 302. The first set of three feature points 306 may comprise any three points that are non-collinear. For instance, the user 114 may select the first feature point 306A in the first set of three feature points 306, which may be on the left side of a nose portion on the first facial portion of the first surface representation 304 of the head portion 302. Similarly, the user 114 may select the second feature point 306B in the first set of three feature points 306, which may be on the right side of the nose portion and the third feature point 306C in the first set of three feature points 306, which may be in the middle of a chin portion on the first facial portion. In accordance with an embodiment, the user 114 may select the first set of three feature points 306, which may comprise any three feature points that form a triangle that lies in a plane parallel to a plane of the first surface representation 304 of the first facial portion. For example, the user 114 may select the first set of three feature points 306 as center points of the two eye portions on the first facial portion and the middle point of the chin portion on the first facial portion.

The processor 202, in conjunction with the network interface 212, may be configured to receive the second surface representation 312 of the second facial portion of the object 108 from the motion-sensing device 106. The processor 202 may receive the second surface representation 312 from the motion-sensing device 106 in real time, near-real time, or lag time. The object 108 may correspond to a human. The second surface representation 312 may correspond to a mesh structure generated by the motion-sensing device 106. Further, the second surface representation 312 may comprise the second facial portion of the object 108. Thereafter, the RME processor 206 may be configured to identify a second set of three feature points on the second surface representation 312 of the second facial portion. The RME processor 206 may be configured to identify the second set of three feature points, based on the first set of three feature points 306. The second set of three feature points on the second surface representation 312 may correspond to the first set of three feature points 306 on the first surface representation 304. For instance, the RME processor 206 may identify a first feature point in the second set of three feature points that correspond to the first feature point 306A. Alternatively stated, the RME processor 206 may identify the first feature point, in the second set of three feature points, on the second surface representation 312. This may occur at a same location at which the first feature point 306A lies on the first surface representation 304 of the first facial portion. Similarly, the RME processor 206 may be configured to identify the remaining feature points in the second set of three feature points.

The RME processor 206 may be configured to animate the head bone structure 308 of the head portion 302, based on a first quaternion ($q_1$). A quaternion may refer to a mathematical notation that is used to represent one or more orientations and one or more rotations of an object in a 3D space. The first quaternion ($q_1$) may represent a bone orientation of the head bone structure 308. The RME processor 206 may compute the first quaternion ($q_1$), based on a joint position of the head bone structure 308 in the head portion 302. For the computation of the first quaternion ($q_1$), the RME processor 206 may determine a first joint position of the head bone structure 308, based on the second surface representation 312. The first joint position may refer to a position of the head bone structure 308 in a 3D space, which may be obtained from the second surface representation 312. The RME processor 206 may further determine a second joint position based on a difference between the first joint position of the head bone structure 308 and a position of a parent bone associated with the head bone structure 308. The parent bone may refer to a bone (such as a neck bone) connected to the head bone structure 308 in the hierarchal set of interconnected bones.

The RME processor 206 may perform a cross product between the first joint position and the second joint position to determine an axis of rotation of the head bone structure 308. Further, the RME processor 206 may perform a dot product of the first joint position and the second joint position to determine an angle of rotation of the head bone structure 308. Thereafter, the RME processor 206 may compute the first quaternion ($q_1$), based on the axis of rotation of the head bone structure 308 and the angle of rotation of the head bone structure 308. The RME processor 206 may further determine a direction of the head bone structure 308 of the head portion 302 by use of locations of the first set of three feature points 306 on the first surface representation 304. The direction of the head bone structure 308 may be parallel to the direction of a plane in which the first set of three feature points 306 lie.

The RME processor 206 may be further configured to estimate the first orientation 310 of the first surface representation 304. The RME processor 206 may estimate the first orientation 310, based on the first set of three feature points 306 on the first surface representation 304. The first orientation 310 may be perpendicular to the plane in which the first set of three feature points 306 lie. The RME processor 206 may be further configured to estimate the second orientation 314 of the second surface representation 312. The RME processor 206 may estimate the second orientation 314, based on the second set of three feature points identified on the second surface representation 312.

With reference to FIG. 3B, there is shown a plane 316, a projected first orientation 318, a projected second orientation 320, and an angular difference (δ) 322. There is also shown a direction 324 of the head bone structure 308, the first orientation 310, and the second orientation 314 (FIG. 3A).

The RME processor 206 may be configured to determine a first horizontal level based on the first orientation 310. The first horizontal level may refer to a plane that is parallel to the first orientation 310. The RME processor 206 may be further configured to determine a second horizontal level based on the second orientation 314. The second horizontal level may refer to a plane that is parallel to the second orientation 314. Thereafter, the RME processor 206 may be configured to perform a check to determine whether the first horizontal level and the second horizontal level are co-planer.

The RME processor 206 may project the first orientation 310 of the first surface representation 304 and the second orientation 314 of the second surface representation 312 on the plane 316. The projection may be executed in the event that the first horizontal level and the second horizontal level are not co-planer. The plane 316 may refer to a plane that is perpendicular to the direction 324 of the head bone structure 308 in the head portion 302. Thereafter, the RME processor 206 may be configured to determine the angular difference 322, also represented as "δ", between the projected first orientation 318 and the projected second orientation 320. In an alternate event that the first horizontal level and the second horizontal level are co-planer, the RME processor 206 may directly determine the angular difference 322 between the first orientation 310 and the second orientation 314. For the determination of the angular difference 322, the RME processor 206 may utilize equation (1), as shown below:

$$\theta = \cos^{-1} \frac{\vec{d_1'} \cdot \vec{d_2'}}{\|\vec{d_1'}\| \cdot \|\vec{d_2'}\|} \quad (1)$$

where, θ is the angular difference 322;
$\vec{d_1}'$ corresponds to the projected first orientation 318; and
$\vec{d_2}'$ corresponds to the projected second orientation 320.

In accordance with an embodiment, the RME processor 206 may determine the angular difference 322, based on the first orientation 310 and the second orientation 314, by use of equation (1). The processor 202 may be further configured to set the direction 324 of the head bone structure 308 as an axis of rotation for the head bone structure 308.

With reference to FIG. 3C, there is further shown a rolled head portion 326 and a rolled head bone structure 328. There is also shown the head portion 302 and the head bone structure 308 of FIG. 3A. The rolled head portion 326 indicate may represent a final pose of the head portion 302 after the determined roll rotation is applied on the head bone structure 308 of the head portion 302.

The RME processor 206 may be configured to determine a second quaternion based on the angular difference 322 and the direction 324 of the head bone structure 308. The second quaternion may represent a rotation of the head bone structure 308 in the span/range of the angular difference 322, around the direction 324 of the head bone structure 308. Thus, the direction 324 may correspond to an axis of rotation of the head bone structure 308. For the computation of the second quaternion, the RME processor 206 may utilize equation (2), as shown below:

$$q_2 = \left[ \cos\left(\frac{1}{2}\theta\right), v_x \sin\left(\frac{1}{2}\theta\right), v_y \sin\left(\frac{1}{2}\theta\right), v_z \sin\left(\frac{1}{2}\theta\right) \right] \quad (2)$$

where, $q_2$ correspond to the second quaternion;
"θ" corresponds to the determined angular difference 322; and
($v_x$, $v_y$, $v_z$) represents the direction 324 (the axis of rotation) of the head bone structure 308.

The RME processor 206 may determine the roll rotation of the head portion 302 of the rigged 3D model based on the first quaternion ($q_1$) and the second quaternion ($q_2$). The RME processor 206 may apply the first quaternion ($q_1$) and the second quaternion ($q_2$) on the head bone structure 308 of the head portion 302, to control the movement of the head portion 302. The rolled head portion 326 may represent a final pose of the head portion 302 after the determined roll rotation is applied on the head bone structure 308 of the head portion 302. The rolled head portion 326 may represent a movement of the head portion 302, which may be synchronized with the movement of the second surface representation 312. The processor 202 may be further configured to display the rolled head portion 326 on the application interface 210, rendered through the display screen 208A. In accordance with an embodiment, the processor 202, in conjunction with the network interface 212, may render the application interface 210 on the display device 110 to display the rolled head portion 326. The roll rotation introduced to the head portion 302 may provide an ability to an apparatus, such as the electronic device 102, to display the roll rotation of head portion 302 of the rigged 3D model without any artifact. Actual movements of a user, such as the user 114, tracked by the motion-sensing device 106 may be imitable by the rigged 3D model as a result of the application of the determined roll rotation on the head bone structure. The roll rotation introduced to the head portion 302 may be used in video-conferencing to display the rigged 3D model of a person with the realistic roll rotation of head portion 302 instead of a generic video sharing between two devices of the video-conferencing system. Further, the determined roll rotation introduced to the head portion 302 may be used to create a virtual presence in a virtual reality based telepresence system, as described for example, in FIG. 4. The determined roll rotation introduced to the head portion 302 may also find application in gaming systems, as described for example, in FIG. 5.

In accordance with an embodiment, the RME processor 206 may be configured to determine the roll rotation of one or more terminal portions of the rigged 3D model by use of equations (1) and (2). Examples of the one or more terminal portions may include, but are not limited to, as foot portion, hand tip portion, thumb joint portion, and head portion.

Figure 4:
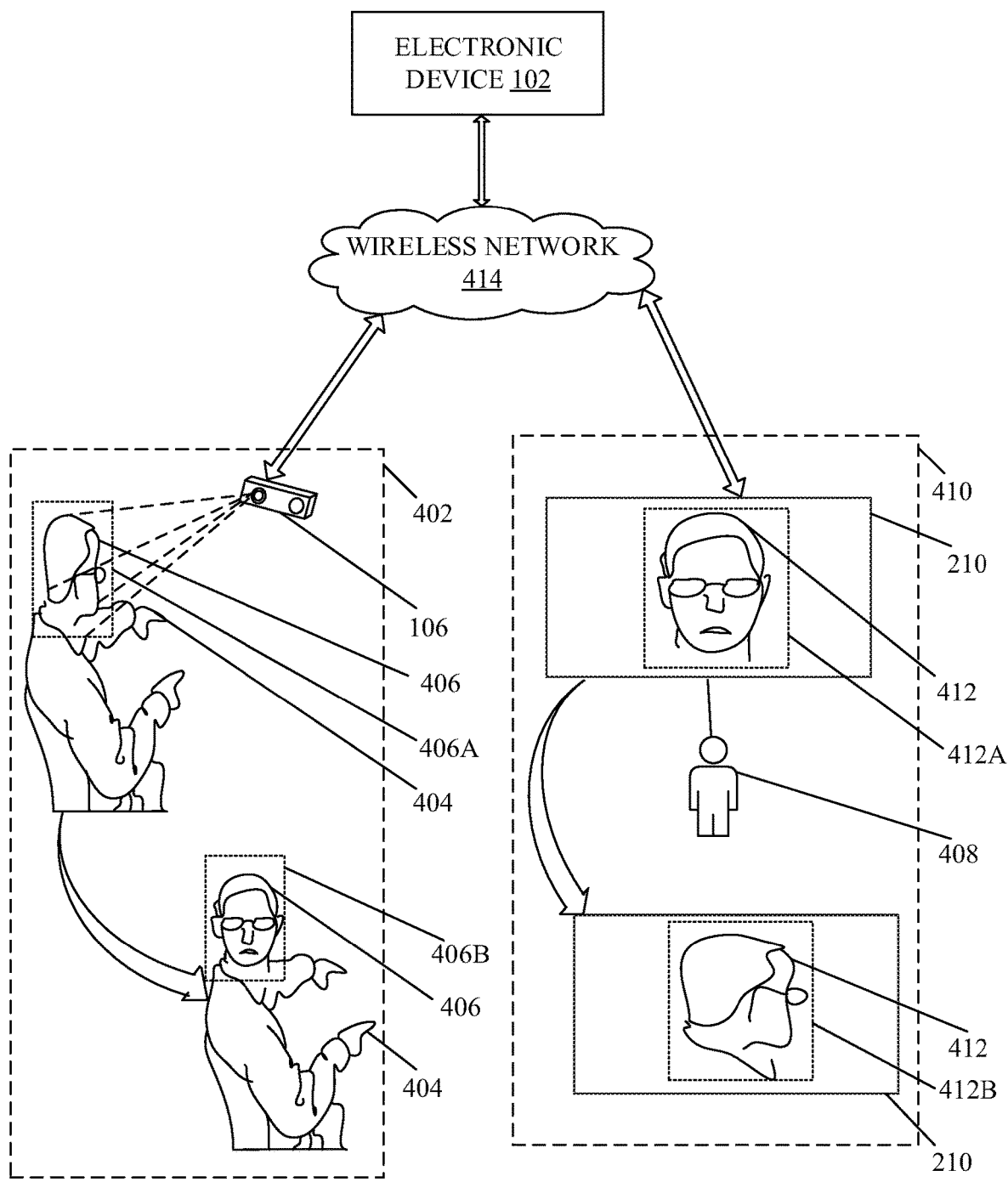
FIG. 4 illustrates a first exemplary scenario for implementation of the disclosed apparatus and method for determination of roll rotation for realistic rigged 3D model animation, in accordance with an embodiment of the disclosure.

FIG. 4 illustrates a first exemplary scenario for implementation of the disclosed apparatus and method for determination of roll rotation for realistic rigged 3D model animation, in accordance with an embodiment of the disclosure. FIG. 4 is explained in conjunction with elements from, for example, FIGS. 1, 2, and 3A to 3C. With reference to FIG. 4, there is shown a first location 402, a first human 404, a first pose 406A of a first head portion 406, and a second pose 406B of the first head portion 406 of the first human 404. There is also shown a second human 408 at a second location 410, a first pose 412A of a second head portion 412 displayed on the application interface 210, and a second pose 412B displayed on the application interface 210. There is further shown the motion-sensing device 106, the electronic device 102, and a wireless network 414, through which the electronic device 102 and the motion-sensing device 106 communicate with each other.

In accordance with the first exemplary scenario, the first human 404 may correspond to the object 108. The second human may correspond to the user 114. The wireless network 414 may correspond to the communication network 112. The motion-sensing device 106 may be in the 'power-on' state.

At the first instance, the first human 404 may be present at the first location 402. The first location 402 may be equipped with the motion-sensing device 106. Further, the motion-sensing device 106 may capture the first pose 406A of the first head portion 406 of the first human 404. While in the first pose 406A, the first head portion 406 of the first human 404 may be oriented in such a way that the first human 404 looks directly at the motion-sensing device 106. Thus, the motion-sensing device 106 may capture the first pose 406A of the first head portion 406 of the first human 404. Thereafter, the motion-sensing device 106 may generate a surface representation, such as the second surface representation, of a facial portion in the first head portion 406 of the first human 404 in the captured first pose 406A. The second surface representation may refer to a face mesh of the facial portion of the first head portion 406. The motion-sensing device 106 may further transmit the generated second surface representation of the first pose 406A of the first head portion 406 to the electronic device 102 in real time, near-real time, or a lag time, over the wireless network 414.

The electronic device 102 may then synchronize the first pose 406A of the first head portion 406 of the first human 404 with the second head portion 412 of the rigged 3D model. For the synchronization of the first pose 406A of the first head portion 406 with the second head portion 412 of the rigged 3D model, the electronic device 102 may determine the roll rotation for the second head portion 412 of the rigged 3D model. An example of the determination of the roll rotation of the second head portion 412 of the rigged 3D model has been explained previously in FIG. 3A to 3C. Thereafter, the electronic device 102 may apply the determined roll rotation on the second head portion 412 of the rigged 3D model to generate the first pose 412A of the second head portion 412 of the rigged 3D model. The electronic device 102 may then display the generated first pose 412A of the second head portion 412 of the rigged 3D model on the application interface 210 at the second location 410. The second human 408 may view the displayed first pose 412A of the second head portion 412 via the application interface 210.

Similarly, in the event that the first human 404 may change the first pose 406A of the first head portion 406 to the second pose 406B of the first head portion 406, the electronic device 102 may synchronize the second head portion 412 of the rigged 3D model with the changed pose. Thus, the electronic device 102 may change the first pose 412A of the second head portion 412 to the second pose 412B of the second head portion 412. The second pose 412B of the second head portion 412 may be synchronized with the second pose 406B of the first head portion 406 of the first human 404.

The display of the first pose 412A and the second pose 412B of the second head portion 412 of the rigged 3D model on the application interface 210 may create a virtual presence of the first human 404 at the second location 410. The second human 408 may feel as if the first human 404 is present at the second location 410. In other words, the second human 408 may experience a perception or perceive that the first human 404 may be present at the second location 410. As a result of the determined roll rotation, the movement of the second head portion of the rigged 3D model may mimic a human-like natural head roll movement. Alternatively stated, the second human 408 may be able to view the second head portion 412 of the rigged 3D model whose movements are synchronized with the actual movements of the first head portion 406 of the first human 404 then present at the first location 402.

In accordance with an embodiment, the motion-sensing device 106 may capture one or more poses of one or more other portions of the first human 404. Further, the electronic device 102 may display the complete rigged 3D model, which may include the second head portion 412 with the determined roll rotation on the application interface 210. In accordance with an embodiment, the functions of the electronic device 102 may be implemented by the server 104. In accordance with an embodiment, the electronic device 102 may render the application interface 210 on the display device 110 or a plurality of display devices (not shown) associated with a plurality of other users (not shown) present at a plurality of other locations (not shown).

Figure 5:
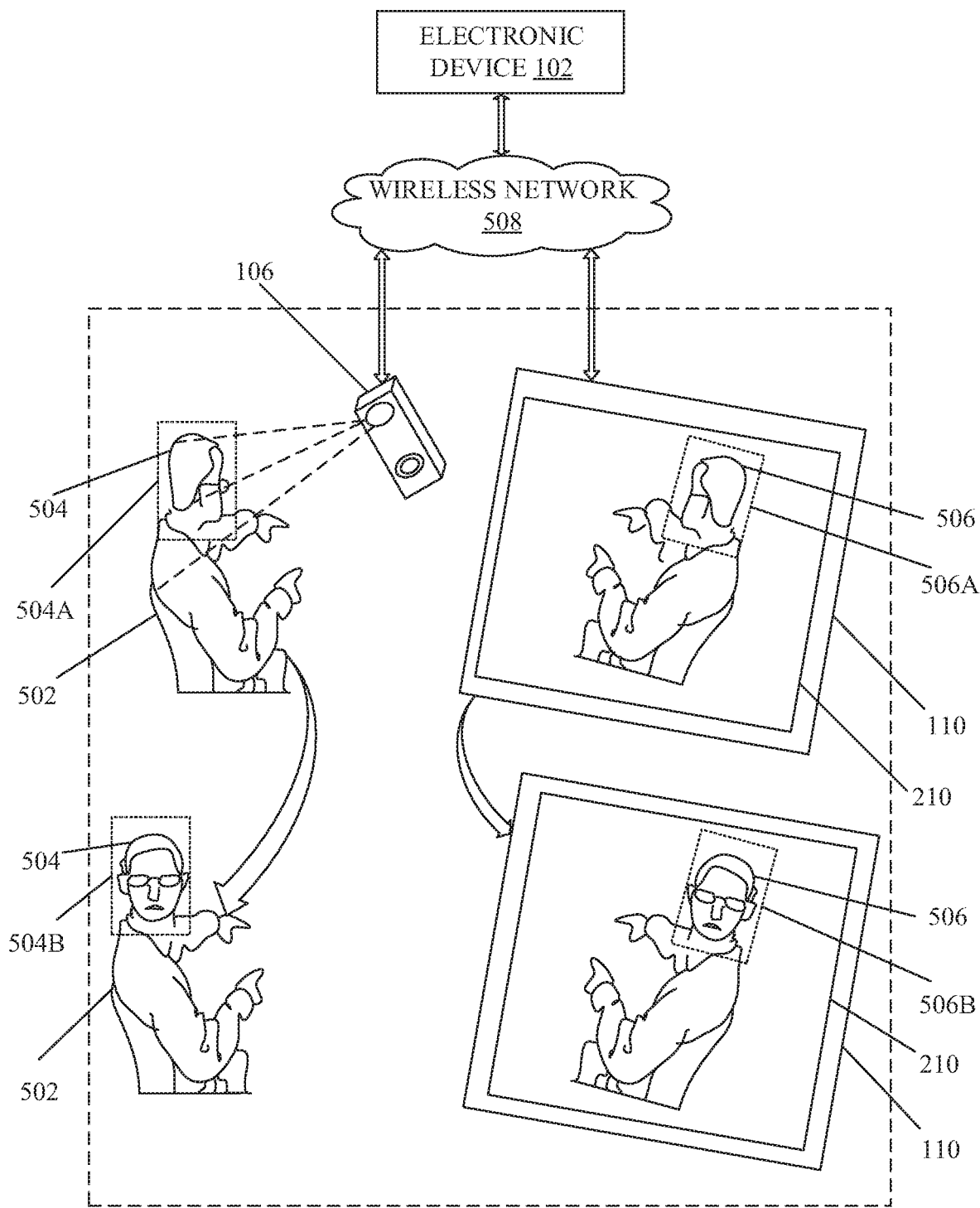
FIG. 5 illustrates a second exemplary scenario for implementation of the disclosed system and method for determination of roll rotation for realistic rigged 3D model animation, in accordance with an embodiment of the disclosure.

FIG. 5 illustrates a second exemplary scenario for implementation of the disclosed system and method for determination of roll rotation for rigged 3D model animation, in accordance with an embodiment of the disclosure. FIG. 5 is explained in conjunction with elements from FIGS. 1, 2, 3A to 3C, and 4. With reference to FIG. 5, there is shown a human 502, a first pose 504A of a first head portion 504 of the human 502, and a second pose 504B of the first head portion 504. There is further shown a first pose 506A of a second head portion 506 of a rigged 3D model, a second pose 506B of the second head portion 506 of the rigged 3D model. There is also shown, the motion-sensing device 106, the electronic device 102, the application interface 210 rendered in the display device 110, and a wireless network 508 over which the motion-sensing device 106, the electronic device 102, and the display device 110 communicate with each other.

In accordance with the second exemplary scenario, the human 502 may correspond to the object 108. The wireless network 508 may correspond to the communication network 112. The motion-sensing device 106 may be in the 'power-on' state. Further, the second exemplary scenario may represent a gaming environment.

The motion-sensing device 106 may be enabled to capture one or more poses of the first head portion 504 of the human 502. For example, as illustrated, the motion-sensing device 106 may capture the first pose 504A of the first head portion 504 of the human 502. In the captured first pose 504A, the first head portion 504 of the human 502 may be oriented in a way that the motion-sensing device 106 may capture a right side of the first head portion 504 of the human 502, as shown. Further, the human 502 may change the first pose 504A of the first head portion 504 to the second pose 504B in which the first head portion 504 of the human 502 may be oriented in a way that the human 502 looks straight at the motion-sensing device 106. Thus, the motion-sensing device 106 may capture the second pose 504B of the first head portion 504. Alternatively stated, the motion-sensing device 106 may track one or more movements of the first head portion 504 of the human 502.

The motion-sensing device 106 may generate the second surface representation of a face of the first head portion 504 of the human 502. The second surface representation may refer to a mesh structure that comprises a face mesh of the facial portion of the first head portion 504. The motion-sensing device 106 may further transmit the second surface representation to the electronic device 102, over the wireless network 508. Thereafter, the electronic device 102 may synchronize the first pose 504A of the first head portion 504 of the human 502 with the second head portion 506 of the rigged 3D model. For the synchronization of the first pose 504A of the first head portion 504 with the second head portion 506 of the rigged 3D model, the electronic device 102 may determine the roll rotation for the second head portion 506 of the rigged 3D model. An example of the determination of the roll rotation of the second head portion 506 of the rigged 3D model has been explained previously in FIG. 3A to 3C. Thereafter, the electronic device 102 may apply the determined roll rotation on the second head portion 506 of the rigged 3D model to generate the first pose 506A of the second head portion 506 of the rigged 3D model. The electronic device 102 may then display the generated first pose 506A of the second head portion 506 of the rigged 3D model on the application interface 210 rendered at the display device 110.

Similarly, the motion-sensing device 106 may transmit the second surface representation associated with the captured second pose 504B of the first head portion 504 of the human 502 to the electronic device 102. Thereafter, the electronic device 102 may synchronize the second head portion 506 of the rigged 3D model with the changed pose. Thus, the electronic device 102 may change the first pose 506A of the second head portion 506 to the second pose 506B of the second head portion 506. The second pose 506B of the second head portion 506 may be synchronized with the second pose 504B of the first head portion 504 of the human 502.

The human 502 may view the displayed first pose 506A and the second pose 506B of the second head portion 506 of the rigged 3D model on the application interface 210. Alternatively stated, the human 502 may be able to view the second head portion 506 of the rigged 3D model whose movements are synchronized with the movements of the first head portion 504. Thus, the human 502 may change the one or more poses of the first head portion 504 to change one or more poses of the second head portion 506 of the rigged 3D model to control one or more parameters of the gaming environment. For example, the human 502 may feel as though (experience a perception that) they are present inside the game scene in the gaming environment, as the rigged 3D model may be a replica of the human 502 and may mimic the actual movements of at least the determined head roll rotation, as described, and avoiding any artifacts.

In accordance with an embodiment, the motion-sensing device 106 may capture one or more poses of one or more other portions of the human 502. Further, the electronic device 102 may display the complete rigged 3D model including the second head portion 506 with the determined roll rotation on the application interface 210.

Figure 6A:
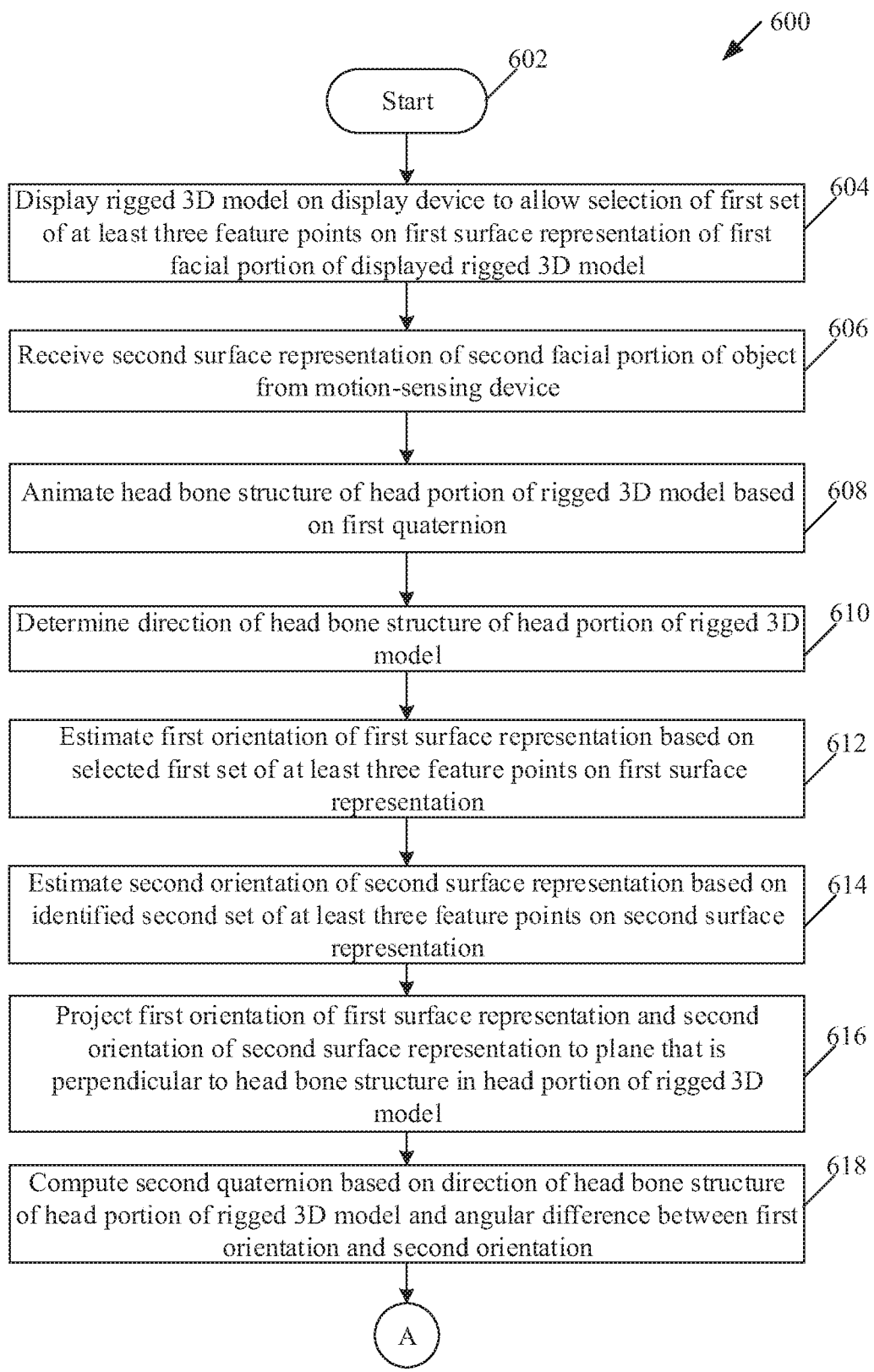
FIGS. 6A and 6B, depict a flowchart that illustrates exemplary operations to determine roll rotation for realistic rigged 3D model animation, in accordance with an embodiment of the disclosure.
Figure 6B:
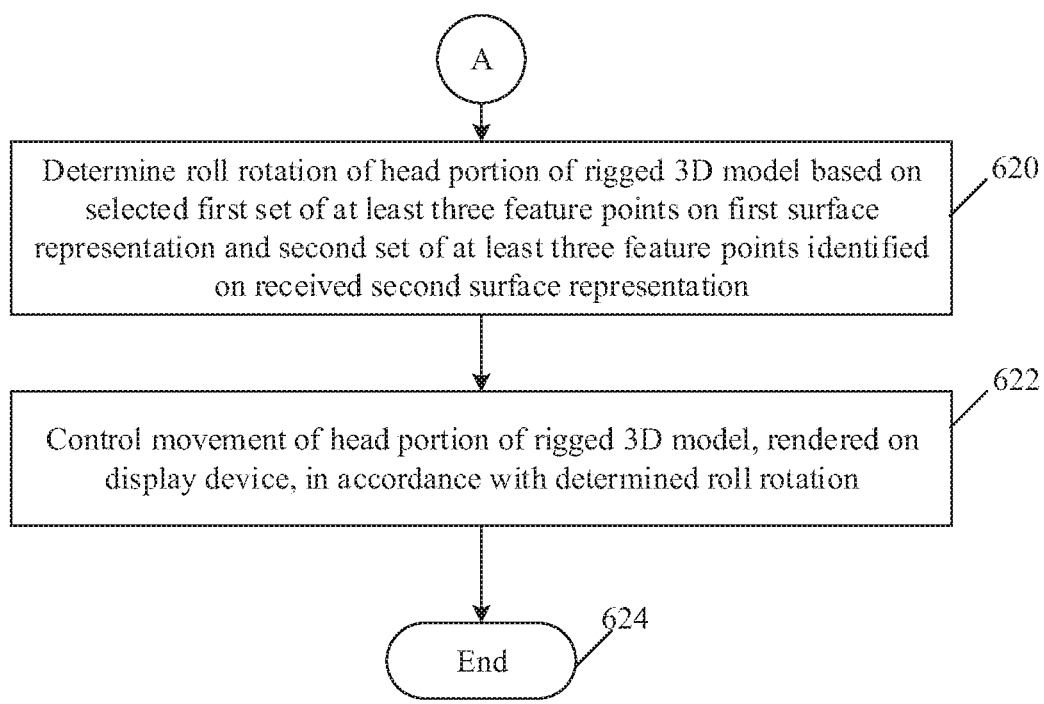

FIG. 6 is a flowchart that illustrates exemplary operations to determine roll rotation for realistic rigged 3D model animation, in accordance with an embodiment of the disclosure. With reference to FIG. 6, there is shown a flowchart 600. The flowchart 600 is described in conjunction with, for example, FIGS. 1, 2, 3A to 3C, 4 and 5. The operations, implemented at the electronic device 102, start at 602 and proceed to 604.

At 604, a rigged 3D model may be displayed on the display device 110 to allow selection of a first set of three feature points on a first surface representation of a first facial portion of the displayed rigged 3D model. The rigged 3D model may comprise a rig that includes a hierarchical set of interconnected bones associated with the first surface representation (Explained, for example, with respect to FIG. 1). The first surface representation may correspond to a mesh structure supported by the hierarchical set of interconnected bones. The first set of three feature points may be selected by the user 114, by providing an input on the display device 110. An example is shown and described in FIG. 3A, wherein the electronic device 102 receives the selection of the first set of three feature points 306 on the first surface representation 304 of a first facial portion on the head portion 302 of the rigged 3D model.

At 606, a second surface representation of a second facial portion of an object may be received from a motion-sensing device. The second surface representation may correspond to a mesh structure. An example of the second surface representation 312 of a second facial portion of the object 108 is shown and described in FIG. 3A. A second set of three feature points may also be identified on the received second surface representation. The second set of three feature points may correspond to the selected first set of three feature points on the first surface representation. An example of the identification of the second set of three feature points is described in FIG. 3A.

At 608, a head bone structure of the head portion of the rigged 3D model may be animated based on a first quaternion. The first quaternion may be computed from a joint position of the head bone structure in the head portion. The first quaternion may represent an orientation of the head bone structure in the head portion. An example of the animated head bone structure 308 is shown and described in FIGS. 3A and 3C.

At 610, a direction of the head bone structure of the head portion of the rigged 3D model may be determined. The direction of the head bone structure may be determined by use of locations of the selected first set of three feature points on the first surface representation. An example of the determination of the direction 324 of the head bone structure 308 is shown and described in FIG. 3B. The direction 324 of the head bone structure 308 may be set as an axis of rotation of the head bone structure 308 of the head portion 302.

At 612, a first orientation of the first surface representation may be estimated based on the selected first set of three feature points on the first surface representation. The first orientation of the first surface representation may be normal to a plane determined based on the selected first set of three feature points on the first surface representation. An example of the first orientation 310 is shown and described in FIG. 3A.

At 614, a second orientation of the second surface representation may be estimated based on the identified second set of three feature points on the second surface representation. The second orientation of the second surface representation may be normal to a plane determined based on the identified second set of three feature points on the second surface representation. An example of the second orientation 314 is shown and described in FIG. 3A.

At 616, the first orientation of the first surface representation and the second orientation of the second surface representation may be projected to a plane that is perpendicular to the head bone structure in the head portion of the rigged 3D model. The projected first orientation and the projected second orientation may be utilized to determine the roll rotation of the head bone structure. An angular difference between the projected first orientation and the projected second orientation may be determined. An example of the projected first orientation 318 and the projected second orientation 320 is shown and described in FIG. 3B.

At 618, a second quaternion may be computed based on the direction of the head bone structure of the head portion of the rigged 3D model and the angular difference between the first orientation and the second orientation. The second quaternion may be computed by use of equations (1) and (2). Further, the second quaternion may represent the roll rotation of the head bone structure. An example of the second quaternion is shown and described in FIG. 3B.

At 620, the roll rotation of the head portion of the rigged 3D model may be determined based on the selected first set of three feature points on the first surface representation and the second set of three feature points identified on the received second surface representation. The determination of the roll rotation of the head portion of the rigged 3D model may be further based on the first quaternion and the second quaternion. The first quaternion and the second quaternion may be applied on the head bone structure to determine the roll rotation of the head portion of the rigged 3D model. An example of the determination of the roll rotation of the head portion 302 of the rigged 3D model is shown and described in FIGS. 3B and 3C.

At 622, a movement of the head portion of the rigged 3D model, rendered on the display device, may be controlled in accordance with the determined roll rotation. The movement of the head portion may be synchronized with the movement of the facial portion of the second surface representation based on the determined roll rotation. An example of the rolled head portion 326 and the rolled head bone structure 328, controlled based on the determined roll rotation, is shown and described in FIG. 3C. The controlled movement of the head portion of the rigged 3D model may be based on the determined roll rotation may be utilized in animation, gaming environments, and creation of virtual presence. The control may pass to the end 624.

In accordance with an embodiment of the disclosure, an apparatus for determination of roll rotation for rigged 3D model animation is disclosed. The apparatus, such as the electronic device 102 (FIG. 1), may comprise one or more circuits (such as the processor 202 and the RME processor 206 (FIG. 2)) coupled to a motion-sensing device (such as the motion-sensing device 106 (FIG. 1)) and a display device (such as the display device 110 (FIG. 1)). The processor 202 may be configured to display a rigged 3D model on the display device 110 to allow selection of a first set of three feature points, such as the first set of three feature points 306 (FIG. 3A) on a first surface representation, such as the first surface representation 304 of a first facial portion of the displayed rigged 3D model. The processor 202 may be further configured to receive a second surface representation, such as the second surface representation 312 (FIG. 3A), of a second facial portion of an object, such as the object 108 (FIG. 1), from the motion-sensing device 106. The processor 202 may be further configured to identify a second set of three feature points, which may correspond to the first set of three feature points 306, on the received second surface representation 312. The RME processor 206 may determine a roll rotation of a head portion, such as the head portion 302 (FIG. 3A), of the rigged 3D model, based on the selected first set of three feature points 306 on the first surface representation 304 and the second set of three feature points identified on the received second surface representation 312. The processor 202 may further control the movement of the head portion 302 of the rigged 3D model rendered on the display device 110, in accordance with the determined roll rotation.

In a conventional animated 3D environment, a hierarchal set of interconnected bones in a rigged 3D model may be transformed, so as to control the deformation of the corresponding surface representation of the rigged 3D model. In such a scenario, orientation of various interconnected bones becomes critical to control the corresponding surface representation. A variety of motion-sensing devices may be utilized to capture one or more orientations of one or more portions of the object by tracking one or more movements of the one or more portions of the object. However, the motion-sensing devices may not provide the orientation of terminal portions or end bones, such as foot portion, hand tip portion, thumb joint portion, and head portion. Further, due to the absence of orientation information, an appropriate roll rotation may not be provided on the terminal portions, such as head portion, of a rigged 3D model. Thus, conventional apparatus introduces various kinds of artifacts that lead to unrealistic movements in the animated rigged 3D model. For example, the conventional apparatus may introduce a 90-degree roll rotation to the head portion even though the facial portion of the head portion is in upward direction. Thus, the disclosed apparatus and method may provide a particular concrete solution to a problem in the conventional apparatuses in the generation of the realistic animation.

The disclosed apparatus, such as the electronic device 102, comprises one or more circuits, such the processor 202 and the RME processor 206, which may determine one or more orientations of the terminal portions, such as the head portion, based on a set of at least three feature points. For example, the RME processor 206 may determine a first orientation of a first surface representation of a head portion of a rigged 3D model, based on a first set of three feature points on a first facial portion of the first surface representation. The RME processor 206 may further determine a second orientation of a second surface representation of an object, based on a second set of three feature points on a second facial portion of the second surface representation. The disclosed apparatus and method calculates the one or more orientations of the terminal portions in a computationally less time. Therefore, the rigged 3D model animation achieved by the disclosed apparatus and method applies a fixed range of roll rotations for a specific orientation. By introduction of the fixed range of roll rotations for a specific orientation, the disclosed apparatus and method prevents the occurrence of artificial artifacts during display of 3D animation. Thus, the disclosed apparatus and method improves the ability of the electronic device 102 by use of the RME processor 206 to display realistic human-like roll rotation movement in 3D animation, thereby providing a specific improvement in 3D animation technology.

Various embodiments of the disclosure may provide a non-transitory, computer-readable medium and/or storage medium, and/or a non-transitory machine readable medium and/or storage medium stored thereon, a machine code and/or a computer program with at least one code section executable by a machine and/or a computer that comprises one or more circuits communicatively coupled to a motion-sensing device and a display device. The at least one code section may be executable by the machine and/or the computer to perform the steps that comprise the display of a rigged 3D model on a display device to allow selection of a first set of three feature points on a first surface representation of a first facial portion of the displayed rigged 3D model. A second surface representation of a second facial portion of an object may be received from the motion-sensing device. A second set of three feature points, which corresponds to the first set of three feature points, may be identified on the received second surface representation. A roll rotation of a head portion of the rigged 3D model may be determined based on the selected first set of three feature points on the first surface representation and the second set of three feature points identified on the received second surface representation. The movement of the head portion of the rigged 3D model rendered on the display device may be controlled in accordance with the determined roll rotation.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An apparatus, comprising:
one or more circuits communicatively coupled to each of a motion-sensing device and a display device, wherein said one or more circuits are configured to:
display a 3D model on said display device to allow selection of a first set of three feature points on a first surface representation of a first facial portion of said displayed 3D model;
receive a second surface representation of a second facial portion of an object from said motion-sensing device, wherein said first facial portion of said displayed 3D model is different from said second facial portion of said object;
identify a second set of three feature points on said received second surface representation, wherein said second set of three feature points corresponds to said first set of three feature points;
estimate a first orientation of said first surface representation based on said selected first set of three feature points, wherein said first orientation is associated with a first plane;
estimate a second orientation of said received second surface representation based on said identified second set of three feature points;
wherein said second orientation is associated with a second plane;
determine a first horizontal level associated with said first orientation, wherein said first horizontal level corresponds to said first plane;
determine a second horizontal level associated with said second orientation, wherein said second horizontal level corresponds to said second plane;
determine co-planarity between said first horizontal level and said second horizontal level;
determine an angular difference between said estimated first orientation and said estimated second orientation based on said co-planarity between said first horizontal level and said second horizontal level;
determine a roll rotation of a head portion of said 3D model based on said determined angular difference; and
control movement of said head portion based on said determined roll rotation, wherein said head portion is displayed on said display device.

2. The apparatus according to claim 1, wherein said first surface representation is a mesh structure of said first facial portion of said 3D model.

3. The apparatus according to claim 1, wherein
said one or more circuits are further configured to receive said second surface representation of said second facial portion in one of a real-time, near real-time, or a lag time from said motion-sensing device, and said received second surface representation is a mesh structure of said second facial portion.

4. The apparatus according to claim 1, wherein
said 3D model is a rigged 3D model, and
said rigged 3-D model includes a hierarchical set of interconnected bones.

5. The apparatus according to claim 1, wherein
said one or more circuits are further configured to determine a third plane based on said selected first set of three feature points, and
said estimated first orientation of said first surface representation is perpendicular to said third plane.

6. The apparatus according to claim 1, wherein said one or more circuits are further configured to determine a direction of a head bone structure based on locations of each of said selected first set of three feature points.

7. The apparatus according to claim 6, wherein said one or more circuits are further configured to set said direction of said head bone structure as a rotation axis for said head portion.

8. The apparatus according to claim 6, wherein said one or more circuits are further configured to:
compute a first quaternion based on a joint position of said head bone structure; and
animate said head bone structure based on said first quaternion.

9. The apparatus according to claim 8, wherein said one or more circuits are further configured to:
project each of said estimated first orientation and said estimated second orientation to a fourth plane based on said co-planarity of said first horizontal level and said second horizontal level, wherein said fourth plane is perpendicular to said head bone structure; and
determine said roll rotation of said head portion based on said projection of each of said estimated first orientation and said estimated second orientation.

10. The apparatus according to claim 9, wherein said one or more circuits are further configured to compute a second quaternion based on said direction of said head bone structure and said determined angular difference between said first orientation and said second orientation.

11. The apparatus according to claim 10, wherein said one or more circuits are further configured to determine said roll rotation of said head portion based on said first quaternion and said second quaternion.

12. The apparatus according to claim 1, wherein said object corresponds to a human.

13. The apparatus according to claim 1, wherein
said one or more circuits are further configured to synchronize at least one movement of said head portion with at least one movement of said second facial portion of said object tracked by said motion-sensing device, and
said at least one movement of said head portion is synchronized with said at least one movement of said second facial portion based on application of at least said determined roll rotation to said head portion.

14. The apparatus according to claim 1, wherein
said head portion of said 3D model is displayed on said display device to create a virtual presence of said object at a first location, and
said object is located at a second location.

15. A method, comprising:
in an apparatus communicatively coupled to each of a motion-sensing device and a display device:
displaying, by one or more circuits of said apparatus, a 3D model on said display device to allow selection of a first set of three feature points on a first surface representation of a first facial portion of said displayed 3D model;
receiving, by said one or more circuits, a second surface representation of a second facial portion of an object from said motion-sensing device,
wherein said first facial portion of said displayed 3D model is different from said second facial portion of said object;
identifying, by said one or more circuits, a second set of three feature points on said received second surface representation, wherein said second set of three feature points corresponds to said first set of three feature points;
estimating, by said one or more circuits, a first orientation of said first surface representation based on said selected first set of three feature points, wherein said first orientation is associated with a first plane;
estimating, by said one or more circuits, a second orientation of said received second surface representation based on said identified second set of three feature points, wherein said second orientation is associated with a second plane;
determining, by said one or more circuits, a first horizontal level associated with said first orientation, wherein said first horizontal level corresponds to said first plane;
determining, by said one or more circuits, a second horizontal level associated with said second orientation, wherein said second horizontal level corresponds to said second plane;
determining, by said one or more circuits, co-planarity between said first horizontal level and said second horizontal level;
determining, by said one or more circuits, an angular difference between said estimated first orientation and said estimated second orientation based on said co-planarity between said first horizontal level and said second horizontal level;
determining, by said one or more circuits, a roll rotation of a head portion of said 3D model based on said determined angular difference; and
controlling, by said one or more circuits, movement of said head portion based on said determined roll rotation, wherein said head portion is displayed on said display device.

16. The method according to claim 15, further comprising:
projecting, by said one or more circuits, each of said first orientation and said second orientation to a third plane perpendicular to a head bone structure in said head portion of said 3D model based on said co-planarity between said first horizontal level and said second horizontal level; and
determining, by said one or more circuits, said roll rotation of said head portion based on said projection of each of said first orientation and said second orientation.

* * * * *